United States Patent Office 2,848,489
Patented Aug. 19, 1958

2,848,489

PREPARATION OF ALKALINE-EARTH SALTS OF PANTOTHENIC ACID

Fred Kagan, Kalamazoo Township, Kalamazoo County, Mich., assignor to The Upjohn Company, Kalamazoo, Mich., a corporation of Michigan No Drawing. Application December 17, 1954
Serial No. 476,080

5 Claims. (Cl. 260—534)

The present invention relates to a novel process for the preparation of salts of pantothenic acid. It is more particularly concerned with an improved process for the preparation of alkaline-earth salts of $\beta$-alanine and with the coupling of the resulting alkaline-earth salts of $\beta$-alanine with $\alpha$-hydroxy-$\beta,\beta$-dimethyl-$\gamma$-butyrolactone to produce the desired alkaline-earth salts of pantothenic acid.

Numerous processes for the preparation of metal salts of $\beta$-alanine and subsequent coupling with $\alpha$-hydroxy-$\beta,\beta$-dimethyl-$\gamma$-butyrolactone (pantolactone) to produce salts of pantothenic acid are disclosed in the prior art. One such method, disclosed in U. S. Patent 2,390,499, involves the preparation of calcium amide or calcium ammonium, reacting the latter compounds with $\beta$-alanine to prepare calcium $\beta$-alanate, and coupling the calcium $\beta$-alanate so prepared with pantolactone to produce calcium pantothenate. The results of the patent process are not completely satisfactory since the end product, i. e., calcium pantothenate, is chemically impure and the yield is undesirably low. The low yield and purity are largely attributable to the fact that side-reactions involved in the process are definitely detrimental to the production of the pantothenic acid salt. To an important degree, the side-reactions result from the fact that free ammonia also reacts with the pantolactone to produce the undesirable by-products. The sources of ammonia are rather apparent. One source of free ammonia is the residual ammonia which remains after the initial calcium and liquid ammonia reaction to produce calcium ammonium or calcium amide in spite of attempts to remove the same. Another and more important source of ammonia is the ammonia which is released during the reaction of calcium ammonium amide with $\beta$-alanine. Thus the residual ammonia which remains after the reaction between calcium and liquid ammonia and the ammonia released in the preparation of calcium $\beta$-alanate detract from the purity and yield of final desired product by virtue of undesirable side-reactions involving the pantolactone and ammonia.

In the process of the present invention the undesirable feature of the prior art is avoided. In the present process the alkaline-earth salt of $\beta$-alanine is prepared without employing an ammonia derivative. The present process thus results in improved yield and improved quality of the final desired pantothenic acid salt.

More specifically, the process of the present invention involves the steps of reacting an alkaline-earth hydride with $\beta$-alanine in the presence of an alcoholic medium and reacting the thus-produced metal salt of $\beta$-alanine with $\alpha$-hydroxy-$\beta,\beta$-dimethyl-$\gamma$-butyrolactone in the presence of the same alcoholic medium to produce a salt of pantothenic acid.

D(—)$\alpha$-hydroxy-$\beta,\beta$-dimethyl-$\gamma$-butyrolactone [Stiller et al., J. Am. Chem. Soc. 62, 1789 (1940)] is ordinarily employed as the starting compound in the preparation of physiologically active salts of D(+)pantothenic acid. However, racemic $\alpha$-hydroxy-$\beta,\beta$-dimethyl-$\gamma$-butyrolactone can also be employed as the starting compound and, if desired, the resulting salt of racemic pantothenic acid can be resolved, e. g., according to the process outlined in U. S. Patent 2,341,610, to separate the physiologically active (+) salt from the physiologically inactive (—) salt. In fact, the novel process is applicable to any $\alpha$-hydroxy-$\beta,\beta$-dimethyl-$\gamma$-butyrolactone, including the L(+) isomer and mixtures of the D(—) and L(+) isomers in any proportions.

A wide range of alcoholic reaction media can be employed in the present process. For example, various glycols such as glycerine, ethylene glycol, propylene glycol, diethylene glycol, isobutylene glycol (2-methyl-1,2-propanediol), beta-butylene glycol (2,3-butanediol), and the like can be employed, as well as the ether glycols such as 3-methoxy-2-butanol, 1-ethyl-4-ethoxy-1-butanol, and the Carbitols containing less than twelve carbon atoms, such as Carbitol (diethylene glycol monoethyl ether), methyl Carbitol, butyl Carbitol, hexyl Carbitol, phenyl Carbitol, benzyl Carbitol, and the like, and the ethers of ethylene glycol sold under the trademark Cellosolve and containing less than ten carbon atoms such as Cellosolve (ethylene glycol monoethyl ether), methyl Cellosolve (ethylene glycol monomethyl ether), butyl Cellosolve (ethylene glycol monobutyl ether), hexyl Cellosolve (ethylene glycol monohexyl ether), benzyl Cellosolve (ethylene glycol benzyl ether), phenyl Cellosolve (ethylene glycol phenyl ether). In addition, various other alcohols can be employed including lower-aliphatic alcohols such as methyl alcohol, ethyl alcohol, isopropyl alcohol, butyl alcohol, and the like; cycloaliphatic alcohols such as cyclohexanol, cyclopentanol, and the like; heterocyclic alcohols such as furfuryl alcohol, tetrahydrofurfuryl alcohol, and the like, and araliphatic alcohols such as benzyl alcohol, phenethyl alcohol, and the like. The preferred media for carrying out the process are the Carbitols and Cellosolves of the aforesaid kind.

In carrying out the process of the present invention an alkaline-earth hydride, e. g., calcium hydride, barium hydride, strontium hydride, and the like, is reacted with $\beta$-alanine in an alcoholic medium of the aforesaid kind, at a temperature between about fifty degrees centigrade and about 150 degrees centigrade, and preferably at a temperature between about seventy degrees centigrade and about 100 degrees centigrade. Preferably the alcoholic medium is present in sufficient amount to effectively fluidify the reaction mixture and permit efficient agitation. The reaction is generally completed in a period between about thirty minutes and about four hours and is ordinarily completed in about one hour at about 95 degrees centigrade. The reaction can be conducted in the presence of a small amount of water, such as up to about five percent of water based on the weight of the reaction mixture, although for best results substantially anhydrous conditions are preferred.

To the thus-produced mixture containing the alkaline-earth salt of $\beta$-alanine and alcoholic medium is added $\alpha$-hydroxy-$\beta,\beta$-dimethyl-$\gamma$-butyrolactone. The reaction between said salt and said lactone is advantageously carried out at a temperature between about twenty degrees centigrade and about 100 degrees centigrade although the preferred range is between about thirty degrees centigrade and about seventy degrees centigrade. The reaction is completed in a period between about twenty minutes and about three hours and is ordinarily completed in about forty minutes at seventy degrees centigrade.

The desired pantothenic acid salt can be recovered from the reaction mixture by the addition of a precipitating agent, or other processes such as direct crystallization, or evaporation of the alcoholic solvent, can also be employed. In some instances when the coupling is carried out at about 35 degrees centigrade the pantothenic acid salt precipitates directly from the reaction mixture as formed.

Precipitating agents or precipitants which can be employed to precipitate the pantothenic acid salt include those in which the alcoholic media are soluble and in which the desired salt of pantothenic acid is insoluble. Representative precipitants include lower-aliphatic esters such as ethyl acetate, butyl acetate, ethyl propionate, and the like, lower-aliphatic ketones such as acetone, diethyl ketone, methyl propyl ketone, and the like, lower-aliphatic ethers such as diethyl ether, dibutyl ether, and the like, aromatic hydrocarbons such as benzene, toluene, xylene, and the like, aliphatic hydrocarbons such as heptane, hexane, pentane, petroleum ether, and the like, and chlorinated hydrocarbons such as carbon tetrachloride, methylene chloride, and the like. The particle size of the pantothenic acid salt precipitate can be increased, if so desired, by heating on a steam bath at a temperature between about forty degrees centigrade and about 45 degrees centigrade. The resulting pantothenic acid salt can be converted to a crystalline form by dissolving in a lower aliphatic alcohol such as absolute ethanol or methanol, seeding with the desired pantothenic acid salt, and permitting the seeded mixture to stand for about 48 hours.

The following examples are illustrative of the process and products of the present invention, but are not to be construed as limiting.

EXAMPLE 1

*Preparation of D(+)calcium pantothenate*

In a 500-milliliter, three-necked, round-bottomed flask equipped with a stirrer, a condenser protected by a drying tube, and a thermometer, was placed 150 milliliters of methyl Cellosolve (pre-dried by swirling with calcium hydride), 1.05 grams (0.025 mole) of calcium hydride, and 4.45 grams (0.05 mole) of β-alanine. The stirrer was started and the mixture was heated to 95–100 degrees centigrade for one hour at which time solution was complete. The solution was filtered to remove a small amount of extraneous material, D(−)pantolactone (6.5 grams, 0.05 mole) was added at 70 degrees centigrade, and the solution was heated at this temperature for 40 minutes. The reaction mixture was poured into ethyl acetate (500 milliliters) and heated on a steam bath to 40–45 degrees centigrade to increase the particle size of the white solid which had precipitated from solution. The solid was removed by filtration under nitrogen and dried in a vacuum oven at 55 degrees centigrade in the presence of concentrated sulfuric acid. The product, a grey glass-like material, was easily ground to a fine powder, 11.3 grams (95 percent yield), melting point 115 degrees centigrade, $[\alpha]_D^{23}$ +21.5 degrees (C., 1.24 percent in water). A bio-assay indicated that this material was 85 percent pure D(+)calcium pantothenate.

An aliquot (3.0 grams) of the above non-crystalline calcium pantothenate was dissolved in 30 milliliters of absolute ethanol, filtered through a thin pad of diatomaceous earth, seeded with calcium pantothenate, and stored at room temperature for 48 hours. A crystalline product was obtained, 1.91 grams (63.6 percent recovery), melting point 194–195.5 degrees centigrade, $[\alpha]_D^{23}$ +29 degrees (C., 0.98 percent in water). A bio-assay indicated 99.3 percent D(+)calcium pantothenate activity.

*Analysis.*—Calculated for $C_{18}H_{32}N_2O_{10}Ca$: Ca, 8.41; N, 5.88. Found: Ca, 8.42; N, 5.58.

If the entire 11.3 grams of crude material had been recrystallized as above, the yield of pure D(+)calcium pantothenate would have been 7.19 grams (60.4 percent).

EXAMPLE 2

*Preparation of D(+)barium pantothenate*

In essentially the same manner as disclosed in Example 1, D(+)barium pantothenate is prepared by using barium hydride and butyl Cellosolve as the starting reactants.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process which comprises the steps of reacting β-alanine with an alkaline-earth hydride in the presence of an alcoholic medium to produce an alkaline-earth salt of β-alanine, and reacting the alkaline-earth salt with α-hydroxy-β,β-dimethyl-γ-butyrolactone in the presence of the alcoholic medium to produce an alkaline-earth salt of pantothenic acid.

2. A process which comprises the steps of reacting β-alanine with an alkaline-earth hydride at a temperature between about fifty and about 150 degrees centigrade and in the presence of an alcoholic medium to produce an alkaline-earth salt of β-alanine, and reacting the alkaline-earth salt with α-hydroxy-β,β-dimethyl-γ-butyrolactone in the presence of the alcoholic medium to produce an alkaline-earth salt of pantothenic acid.

3. A process which comprises the steps of reacting β-alanine with an alkaline-earth hydride at a temperature between about fifty and about 150 degrees centigrade and in the presence of an alcoholic medium to produce an alkaline-earth salt of β-alanine, and reacting the alkaline-earth salt with α-hydroxy-β,β-dimethyl-γ-butyrolactone in the presence of the alcoholic medium at a temperature between about 20 and about 100 degrees centigrade to produce an alkaline-earth salt of pantothenic acid.

4. A process which comprises the steps of reacting β-alanine with an alkaline-earth hydride at a temperature between about fifty and about 150 degrees centigrade and in the presence of an ether of ethylene glycol containing less than ten carbon atoms to produce an alkaline-earth salt of β-alanine, and reacting the alkaline-earth salt with α-hydroxy-β,β-dimethyl-γ-butyrolactone in the presence of the ether of ethylene glycol to produce an alkaline-earth salt of pantothenic acid.

5. A process which comprises the steps of reacting β-alanine with calcium hydride at a temperature between about seventy and about 100 degrees centigrade and in the presence of ethylene glycol monomethyl ether to produce calcium β-alanate, and reacting the calcium β-alanate with α-hydroxy-β,β-dimethyl-γ-butyrolactone in the presence of the ethylene glycol monomethyl ether at a temperature between about thirty and about 70 degrees centigrade to produce calcium pantothenate.

References Cited in the file of this patent

UNITED STATES PATENTS

| | | |
|---|---|---|
| 2,367,791 | Parke et al. | Jan. 23, 1945 |
| 2,390,499 | Carlson et al. | Dec. 11, 1945 |
| 2,672,480 | Matlack | Mar. 16, 1954 |

OTHER REFERENCES

Hurd: Chemistry of the Anhydrides (1952), pp. 32–33, 43–44, 48.